Patented Oct. 21, 1947

2,429,587

UNITED STATES PATENT OFFICE 2,429,587

MODIFIED VINYL ALKYL ETHER POLYMERS

Calvin E. Schildknecht, Easton, Pa., assignor to General Aniline & Film Corporation, New York, N. Y., a corporation of Delaware No Drawing. Application December 30, 1944, Serial No. 570,756

7 Claims. (Cl. 260—79)

This invention relates to a process of modifying rubbery, extensible, high molecular weight, polymeric vinyl alkyl ethers and to the modified polymers.

The high molecular weight, rubbery, extensible polyvinyl alkyl ethers are useful in stabilized form as substitutes for natural rubber, but are limited in this respect, however, by their solubility in such common organic solvents as benzene, toluene, ethyl acetate, diethyl ether, carbon tetrachloride, chloroform, etc. It is desirable, therefore, to obtain such polymers in a form in which they are resistant to attack by common organic solvents. Sulfur is a particularly desirable stabilizer for the polymers because of its low cost, availability and good color.

It is an object of this invention to provide a process of extending the useful field of the rubbery, extensible vinyl alkyl ether polymers.

It is a further object of the invention to provide rubbery, extensible vinyl alkyl ether polymers which are resistant to attack by common organic solvents.

I have found that the solubility of the rubbery, extensible polymeric vinyl alkyl ethers in common organic solvents may be substantially reduced and polymers which do not dissolve or only swell in such solvents obtained by incorporating in the polymers finely divided sulfur and an organic peroxide and thereafter subjecting the polymers to a heat treatment sufficient to bring about a combining of the polymers with sulfur.

The reduction in the solubility of the polymers is due to a combining of the sulfur therewith to give a cross-linking effect or vulcanization of the polymers. This effect is promoted by the presence of the organic peroxide, the role of which may be explained as causing a cracking or splitting of the chain in the polymer with the result that the free or active ends thereof combine with the sulfur to form bridges or cross-links. It is to be understood, however, that our invention does not depend for its efficacy upon any theory of action in respect to the role played by the organic peroxide, but rather upon the bringing together of the several ingredients and subjecting them to a heat treatment effective to cause a combining of the polymers with sulfur.

The process may be applied to the reduction in the solubility in common organic solvents of any of the rubbery, extensible polymeric vinyl alkyl ethers, for example, to those from the lower alkyl vinyl ethers, e. g., vinyl methyl ether, vinyl isopropyl ether, vinyl n-butyl ether, vinyl isobutyl ether. etc., to mixtures thereof and to the rubberlike, extensible polymers obtained by the copolymerization of vinyl alkyl ethers with each other. Accordingly, the term vinyl alkyl ether polymer as used in the claims is intended to embrace the individual polymers, mixtures thereof, and the copolymers, all as defined above.

Organic peroxides which may be employed in the present process are the diacyl peroxides, for example, benzoyl peroxide, acetylbenzoyl peroxide, lauroyl peroxide, etc. The amount thereof added to the polymers will vary with the particular polymer being treated as well as with the temperature of the heat treatment, larger amounts being required where lower temperatures are employed in causing the combining of the sulfur with the polymer, i. e., in the vulcanization. In general, the addition of about 0.1 to 5% of an organic peroxide and of about 0.5 to 10% of finely divided sulfur, both on the weight of the polymer, will be found sufficient on treatment of the polymer with heat as described herein, to materially reduce the solubilities of the polymers. Sulfur of suitable degree of fineness are the grades known as rubbermakers' and colloidal sulfur. The polymers treated by the present process may also contain about 0.1 to 1% of a substance stabilizing it against depolymerization by heat, such as p-hydroxyphenyl morpholine.

The heat treatment of the polymers compounded with sulfur and organic peroxide may be carried out in any suitable manner. The extent of the heat treatment will vary, and will depend upon the extent to which reduction in solubility of the polymer is desired, on the particular polymer, on the temperature of the treatment, and on the amount of the organic peroxide employed. At 100° C., 10 to 48 hours is required to effect a substantial change in the solubility of the polymers, whereas at 175° C., 30 minutes to 2 hours is effective. Temperatures of about 100 to 200° C. generally are suitable for effecting the vulcanization and conversion in solubility, although temperatures higher or lower than this range may also be employed with corresponding decrease or increase in the rate at which the polymer is combined with sulfur.

Compounding of the finely divided sulfur and organic peroxide in the polymers may be effected by mixing on a two-roll rubber mill. In some cases it may be found more suitable to incorporate the sulfur and organic peroxide in a wet way, particularly for the safe handling of some of the organic peroxides. This may be accomplished by dissolving the polymer in a volatile organic solvent, such as benzene, stirring the sulfur and organic peroxide therein, the latter being added, if desirable, in the form of a suspension in the same or other suitable volatile organic solvent, and thereafter evaporating the solvent at a temperature about 50° C. to recover the polymer in the rubbery, extensible but compounded form.

The invention is further illustrated by the following specific examples to which however, it is not to be limited and in which parts are by weight. The intrinsic viscosity mentioned herein was determined on a benzene solution of the polymer made up in the proportion of 1 gram of the same to 100 ml. of benzene in an Ostwald-Fenske viscometer at 25° C.

Example 1

36 parts of a rubbery, extensible polyvinyl n-butyl ether of intrinsic viscosity 14 was mixed at 30-40° C. on a two-roll rubber mill with one part of rubbermakers' sulfur and one part of benzoyl peroxide added from a 10% solution in benzene until a uniform, rubbery mass was obtained.

The rubbery mixture was then heated at 150° C. for 2 hours. A sample of the heated polymer tested only partially soluble in benzene indicating cross-linking to have occurred in the polymer through combination with sulfur. The remainder of the treated polymer was further heated at 175° C. for 1 hour. After cooling to room temperature, it was found to swell in benzene but to be substantially insoluble therein. A portion of the same polymer containing the sulfur but no benzoyl peroxide and heat treated in the same manner remained soluble in benzene.

Example 2

18 parts of a rubbery, extensible polymeric vinyl n-butyl ether was milled at 40° C. with 0.5 part of rubbermakers' sulfur and 5 parts of a 10% solution of benzoyl peroxide in benzene for 10 minutes. The milled polymer was then heated in an oven at 150° C. for 4 hours. The heat-treated polymer retained its rubbery character but was substantially insoluble in benzene, swelling therein to a grainy gel in the same way that vulcanized natural rubber swells in benzene. Before this heat treatment the sulfur-containing polymer had given smooth solutions in benzene.

It is a characteristic of the rubbery, extensible vinyl alkyl ether polymers containing sulfur, before heat treatment, to give completely smooth solutions in their organic solvents, such as benzene, ethyl acetate, diethyl ether and chloroform, in contrast to unvulcanized natural rubber and butadiene-styrene type rubbers containing sulfur which give grainy solutions in their best organic solvents. Graininess in the solution is indicative of a certain amount of cross-linkage in the rubber before the vulcanization proper.

The high molecular weight, rubbery, extensible polymeric vinyl alkyl ethers may be prepared from vinyl alkyl ethers obtained by the reaction of acetylene and the corresponding alcohol, which monomers have been subjected to washing with water to remove alcohol and any aldehyde present. In some cases it may be necessary to further purify the monomers as alcohols and aldehydes are inimical to the functioning of acid-reacting catalysts. This further purification may be accomplished by allowing the monomers to stand over powdered potassium hydroxide or metallic sodium for about 24 hours and then fractionally distilling them from the solid treating agent. One precise fractional distillation is generally sufficient.

The purified vinyl alkyl ether monomers may be polymerized to high molecular weight, rubbery, extensible products by the portionwise addition of boron fluoride-diethyl ether addition compound, with stirring, to the vinyl alkyl ether monomer in propane at about −78° C., efficient cooling means being employed to maintain this low temperature. After the polymerization has been completed, which may be determined by the addition of a small amount of the boron fluoride catalyst to a sample of the reaction mixture, absence of heating or charring denoting completion of the polymerization, the catalyst in the polymer is quenched or inactivated by working the polymer with sufficient ammonium hydroxide to neutralize the catalyst residue, a quantity of methanol being stirred in at the same time, if desired. The quenching operation is preferably conducted at the low temperatures prevailing in the polymerization reaction. This may be conveniently done by mixing concentrated ammonium hydroxide which has been chilled to the low polymerization temperatures with the polymer while it is still in the polymerization vessel, the temperature of the polymer being not allowed to rise unduly.

I claim:

1. A process of treating a rubbery, extensible vinyl alkyl ether polymer, which comprises vulcanizing the polymer compounded with sulfur and a diacyl peroxide to a rubbery, extensible product.

2. A process of treating a rubbery, extensible vinyl alkyl ether polymer, which comprises vulcanizing the polymer compounded with sulfur and benzoyl peroxide to a rubbery, extensible product.

3. A process of treating a rubbery, extensible vinyl n-butyl ether polymer, which comprises vulcanizing the polymer compounded with sulfur and benzoyl peroxide to a rubbery, extensible product.

4. A rubbery, extensible vulcanization product of a mixture comprising a rubbery extensible vinyl alkyl ether polymer, sulfur, and a diacyl peroxide.

5. A rubbery, extensible vulcanization product of a mixture comprising a rubbery extensible vinyl alkyl ether polymer, sulfur, and benzoyl peroxide.

6. A rubbery, extensible vulcanization product of a mixture comprising a rubbery extensible vinyl n-butyl ether polymer, sulfur, and diacyl peroxide.

7. A rubbery, extensible vulvanization product of a mixture comprising a rubbery extensible polyvinyl n-butyl ether, sulfur and benzoyl peroxide.

CALVIN E. SCHILDKNECHT.

REFERENCES CITED

The following references are of record in the file of this patent:

UNITED STATES PATENTS

| Number | Name | Date |
|---|---|---|
| 2,374,078 | Coffman | Apr. 17, 1945 |

Certificate of Correction

Patent No. 2,429,587.  October 21, 1947.

CALVIN E. SCHILDKNECHT

It is hereby certified that errors appear in the printed specification of the above numbered patent requiring correction as follows: Column 4, line 58, claim 6, for "and diacyl" read *and a diacyl*; line 60, claim 7, for "vulvanization" read *vulcanization*; and that the said Letters Patent should be read with these corrections therein that the same may conform to the record of the case in the Patent Office.

Signed and sealed this 6th day of January, A. D. 1948.

[SEAL]

THOMAS F. MURPHY,
*Assistant Commissioner of Patents.*